United States Patent
Wagman et al.

(10) Patent No.: US 7,181,066 B1
(45) Date of Patent: Feb. 20, 2007

(54) METHOD FOR LOCATING BAR CODES AND SYMBOLS IN AN IMAGE

(75) Inventors: Adam Wagman, Framingham, MA (US); Sateesh G. Nadabar, Framingham, MA (US); Jason Davis, Bellingham, MA (US)

(73) Assignee: Cognex Technology and Investment Corporation, Mt. View, CA (US)

( * ) Notice: Subject to any disclaimer, the term of this patent is extended or adjusted under 35 U.S.C. 154(b) by 712 days.

(21) Appl. No.: 10/329,908

(22) Filed: Dec. 26, 2002

(51) Int. Cl.
*G06K 9/18* (2006.01)

(52) U.S. Cl. .............. 382/183; 235/462.08; 235/462.1; 382/100

(58) Field of Classification Search ................ 235/454, 235/462.02, 462.09, 494, 462.01, 462.08, 235/462.1; 382/101, 183, 100
See application file for complete search history.

(56) References Cited

U.S. PATENT DOCUMENTS

| | | | |
|---|---|---|---|
| 3,868,634 A | 2/1975 | Dolch | |
| 4,282,425 A | 8/1981 | Chadima, Jr. et al. | |
| 4,308,455 A | 12/1981 | Bullis et al. | |
| 4,782,220 A | 11/1988 | Shuren | |
| 4,894,523 A | 1/1990 | Chadima, Jr. et al. | |
| 4,948,955 A | 8/1990 | Lee et al. | |
| 5,120,940 A | 6/1992 | Willsie | |
| 5,124,537 A | 6/1992 | Chandler et al. | |
| 5,155,343 A | 10/1992 | Chandler et al. | |
| 5,187,355 A | 2/1993 | Chadima, Jr et al. | |
| 5,187,356 A | 2/1993 | Chadima, Jr. et al. | |
| 5,262,623 A * | 11/1993 | Batterman et al. | 235/454 |
| 5,262,625 A | 11/1993 | Tom et al. | |
| 5,296,690 A | 3/1994 | Chandler et al. | |
| 5,304,786 A | 4/1994 | Pavlidis et al. | |
| 5,371,690 A * | 12/1994 | Engel et al. | 382/151 |
| 5,378,883 A | 1/1995 | Batterman et al. | |
| 5,418,862 A | 5/1995 | Zheng et al. | |
| 5,446,271 A | 8/1995 | Cherry et al. | |
| 5,455,414 A | 10/1995 | Wang | |
| 5,463,214 A | 10/1995 | Longacre, Jr. et al. | |
| 5,468,945 A * | 11/1995 | Huggett et al. | 235/462.02 |
| 5,478,999 A | 12/1995 | Figarella et al. | |
| 5,481,098 A | 1/1996 | Davis et al. | |
| 5,487,115 A | 1/1996 | Surka | |

(Continued)

FOREIGN PATENT DOCUMENTS

EP 0185782 3/1989

(Continued)

*Primary Examiner*—Gregory Desire
(74) *Attorney, Agent, or Firm*—Russ Weinzimmer

(57) ABSTRACT

A search method is disclosed for finding bar code symbols and various two-dimensional symbols, regardless of orientation, that is efficient, robust, and easy to use. The method works well on cluttered backgrounds, on skewed symbols, when symbols are almost touching, and when symbols are adjacent to text. The method includes choosing a candidate start region in the image, and then determining whether the candidate start region includes at least a portion of a candidate oriented encoded signal. Next, an approximate orientation of the candidate oriented encoded signal is determined. Then, the candidate start region is grown, using the approximate orientation, so as to form a candidate symbol region that encloses an entire candidate code symbol, including at least a portion of the candidate start region. The method is finely responsive to orientation.

23 Claims, 11 Drawing Sheets

U.S. PATENT DOCUMENTS

| | | | |
|---|---|---|---|
| 5,507,527 A | 4/1996 | Tomioka et al. | |
| 5,512,739 A * | 4/1996 | Chandler et al. | 235/462.09 |
| 5,523,552 A | 6/1996 | Shellhammer et al. | |
| 5,539,191 A | 7/1996 | Ackley | |
| 5,550,366 A | 8/1996 | Roustaei | |
| 5,591,956 A | 1/1997 | Longacre, Jr. et al. | |
| 5,612,524 A | 3/1997 | Sant'Anselmo et al. | |
| 5,635,699 A | 6/1997 | Cherry et al. | |
| 5,675,137 A | 10/1997 | Van Haagen et al. | |
| 5,682,030 A | 10/1997 | Kubon | |
| 5,691,527 A | 11/1997 | Hara et al. | |
| 5,698,833 A * | 12/1997 | Skinger | 235/462.09 |
| 5,723,853 A | 3/1998 | Longacre, Jr. et al. | |
| 5,739,518 A | 4/1998 | Wang | |
| 5,756,981 A | 5/1998 | Roustaei et al. | |
| 5,777,309 A | 7/1998 | Maltsev et al. | |
| 5,821,520 A | 10/1998 | Mulla et al. | |
| 5,825,006 A | 10/1998 | Longacre, Jr. et al. | |
| 5,889,270 A | 3/1999 | Van Haagen et al. | |
| 5,914,476 A | 6/1999 | Gerst, III et al. | |
| 5,932,862 A | 8/1999 | Hussey et al. | |
| 5,949,052 A | 9/1999 | Longacre, Jr. et al. | |
| 6,000,612 A | 12/1999 | Xu | |
| 6,053,407 A | 4/2000 | Wang et al. | |
| 6,075,883 A | 6/2000 | Stern et al. | |
| 6,088,482 A | 7/2000 | He et al. | |
| 6,095,422 A | 8/2000 | Ogami | |
| 6,123,261 A | 9/2000 | Roustaei | |
| 6,123,262 A * | 9/2000 | Shellhammer | 235/462.09 |
| 6,126,074 A * | 10/2000 | He et al. | 235/454 |
| 6,158,661 A | 12/2000 | Chadima, Jr. et al. | |
| 6,176,428 B1 | 1/2001 | Joseph et al. | |
| 6,234,395 B1 | 5/2001 | Chadima, Jr. et al. | |
| 6,234,397 B1 | 5/2001 | He et al. | |
| 6,250,551 B1 | 6/2001 | He et al. | |
| 6,298,176 B2 | 10/2001 | Longacre, Jr. et al. | |
| 6,340,119 B2 | 1/2002 | He et al. | |
| 6,371,373 B1 | 4/2002 | Ma et al. | |
| 6,405,925 B2 | 6/2002 | He et al. | |
| 6,454,168 B1 | 9/2002 | Brandt et al. | |
| 6,491,223 B1 | 12/2002 | Longacre, Jr. et al. | |
| 6,494,375 B1 * | 12/2002 | Ishibashi et al. | 235/462.11 |
| 6,505,778 B1 | 1/2003 | Reddersen et al. | |
| 6,565,003 B1 * | 5/2003 | Ma | 235/462.1 |
| 6,708,884 B1 * | 3/2004 | Su et al. | 235/462.09 |
| 6,857,566 B2 * | 2/2005 | Wankmueller | 235/380 |

FOREIGN PATENT DOCUMENTS

| | | |
|---|---|---|
| WO | WO09949347 | 9/1999 |
| WO | WO02075637 | 9/2002 |
| WO | WO2004/0064 | 1/2004 |

* cited by examiner

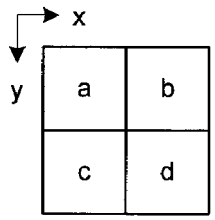

$\Delta_1 = b - c$ $\Delta_2 = d - a$

| GRADIENT MAGNITUDE | $\mu = \sqrt{\Delta_1^2 + \Delta_2^2}$ |
|---|---|
| GRADIENT ANGLE | $\theta = \text{atan2}(\Delta_2, \Delta_1) - \dfrac{\pi}{4}$ |
| QUANTIZED GRADIENT MAGNITUDE | $m = \min(\text{round}(\mu), 255)$ |
| QUANTIZED GRADIENT ANGLE | $t = \text{round}\left(\theta \cdot \dfrac{256}{2\pi}\right) \bmod 256$ |
| MASKED QUANTIZED GRADIENT ANGLE | $t_m = \begin{cases} 255 & \text{if } m < m_{thresh} \\ 0 & \text{if } m \geq m_{thresh} \text{ and } t = 255 \\ t & \text{otherwise} \end{cases}$ |
| APPROXIMATE QUANTIZED GRADIENT MAGNITUDE | $M = |\Delta_1| + |\Delta_2|$ |

FIG. 5

METHOD FOR LOCATING BAR CODES AND SYMBOLS IN AN IMAGE

FIELD OF THE INVENTION

The invention relates to machine vision, and more particularly to machine-readable symbols.

BACKGROUND OF THE INVENTION

Bar code symbol locators are known that determine the location and orientation of bar code symbols in an image. Locators are also known that are adapted to locate other particular symbol types, such "data matrix codes", or "Maxi-Codes". Further, in many applications, images of objects include many features in addition to symbols, such as text and/or pictures, and so symbol locators must distinguish between symbols, and text and/or pictures.

It is known to use boundary tracking to locate a symbol in an image. However, boundary tracking methods are sometimes distracted by features other than symbols in an image (e.g., text), resulting in computational inefficiencies, inaccuracies, and lack of robustness. Moreover, to determine whether a symbol has been found, typical boundary tracking methods require specific information about each possible symbology.

Each symbology typically has a non-data-dependent "finder pattern". For example, each data matrix code includes a set of three concentric circles that can be used to help locate a data matrix code symbol. However, other symbologies employ other finder patterns. Further complicating the situation, finder patterns are usually relatively small with respect to the object, resulting in long search times, and high levels of confusion in known methods. In addition, distortion of the finder pattern in an image due to variations in perspective, package wrinkles, or overlaid markings, can further compromise the speed, reliability, and accuracy of known methods.

Some approaches to omnidirectional bar code location are known, but they typically have significant limitations. For example, regions of the image with similar coarse angle responses may be erroneously connected to form candidate bar code regions. Also, such techniques do not work well given a cluttered background, or when symbols are nearly touching, since known approaches tend to produce candidate regions that erroneously contain significant portions of the image, and extraneous symbols, in addition to the desired result.

Moreover, some techniques use a small number of orientation kernels, and consequently such techniques are only coarsely sensitive to orientation, and are particularly poor at detecting skewed symbols. Such techniques are also poor at distinguishing symbols from adjacent text, since both appear to be equivalently oriented to a coarse angle detector. Also, such techniques tend to erroneously produce many extra potential bar code or other regions, since they are incapable of discriminating at an early stage against, for example, text.

SUMMARY OF THE INVENTION

In a general aspect, the invention is a method for omnidirectional location of bar code symbols and other graphical code symbols in an image of an object, each code symbol having an oriented encoded signal. The method includes choosing a candidate start region in the image, and then determining whether the candidate start region includes at least a portion of a candidate oriented encoded signal. Next, an approximate orientation of the candidate oriented encoded signal is determined. Then, the candidate start region is grown, using the approximate orientation, so as to form a candidate symbol region that encloses an entire candidate code symbol, including at least a portion of the candidate start region. Then, typically a decision is made as to whether to locate another code symbol. Another candidate start region in the image is then chosen.

In an illustrative embodiment, choosing a candidate start region in the image includes dividing the entire image into a plurality of uniform tiles, and using each tile of a regular pattern of tiles as a candidate start region. Alternatively, choosing a candidate start region in the image can include specifying a point in the image where a code symbol is likely to appear, and choosing a set of contiguous pixels near that point to serve as the candidate start region. Typically, the set of contiguous pixels defines a rectangular region, although other shapes are possible.

In another illustrative embodiment, deciding whether to locate another code symbol includes determining whether a specified number of candidate code symbols were already found. Alternatively, deciding whether to locate another code symbol includes determining whether a specified number of candidate code symbols were successfully decoded. In an embodiment having an image divided into a plurality of uniform tiles, deciding whether to locate another code symbol includes processing until each uniform tile has been chosen as a candidate start region. In another embodiment, deciding whether to locate another code symbol includes processing additional candidate start regions until a specified amount of time had elapsed. It is also possible that deciding whether to locate another code symbol can include processing additional candidate start regions until an external event occurs.

In another embodiment, determining whether the candidate start region includes at least a portion of a candidate oriented encoded signal includes determining a number of pixels in the candidate start region that have an edge magnitude exceeding an edge magnitude threshold, and then comparing the number of pixels to a pixel count threshold.

In a further embodiment, determining whether the candidate start region includes at least a portion of a candidate oriented encoded signal includes selecting a subset of pixels from the candidate start region having enough information for signal detection, then computing a measure of interest of the subset of pixels for use in eliminating candidate start regions that do not contain a signal of interest, without rejecting candidate start regions that might contain a signal of interest, and then deciding whether the measure of interest is sufficient to warrant further examination of the candidate start region.

In a further embodiment, it is useful to decide whether to continue refining the measure of interest, then selecting another subset of pixels from the candidate start region having enough information for signal detection. Then, using the another subset of pixels, another measure of interest is computed. In an alternate embodiment, selecting a subset of pixels includes selecting a plurality of horizontal stripes of the candidate start region as a subset of pixels.

In another embodiment, determining whether the candidate start region includes at least a portion of a candidate oriented encoded signal includes analyzing a histogram of edge angles.

In some embodiments, the measure of interest of the subset of pixels is used to distinguish blank regions from non-blank regions.

Computing a measure of interest of the subset of pixels can include determining a number of pixels in the candidate start region that have an edge magnitude exceeding an edge magnitude threshold.

Sometimes deciding whether the measure of interest is sufficient to warrant further examination includes comparing the measure of interest to a threshold.

In another illustrative embodiment, determining whether the candidate start region is likely to include at least a portion of a candidate oriented encoded signal includes applying an oriented edge detector to the candidate start region to provide a plurality of edge angles. Next, an edge angle histogram is computed based on the plurality of edge angles. Then, the edge angle histogram is analyzed to determine whether the candidate start region is likely to include at least a portion of a candidate oriented encoded signal.

In some embodiments, analyzing the edge angle histogram includes detecting peaks in the edge angle histogram, then selecting a set of peaks in the edge angle histogram consistent with the presence of an oriented encoded signal. Next, the total area under the set of peaks is computed, and then the total area is compared to a total area threshold.

In yet another embodiment, growing the candidate start region includes choosing a seed region that overlaps at least a portion of the candidate start region, and then growing the seed region to form the candidate symbol region, using at least the signal orientation.

In another embodiment, choosing a candidate start region in the image includes selecting a rectangular region of an image as the candidate start region, and then selecting several horizontal stripes of the rectangular region as a subset for analysis.

In an illustrative embodiment, choosing a candidate start region in the image includes selecting a rectangular region of the image. Also, determining whether the candidate start region includes at least a portion of a candidate oriented encoded signal includes selecting several horizontal stripes of the rectangular region as a first subset. Then, approximate edge magnitude pixels are computed at a plurality of positions within the several horizontal stripes. Next, a first count of edge magnitude pixels is computed by counting how many edge magnitude pixels have an edge magnitude that exceeds a first magnitude threshold. Then, it is determined whether the first count exceeds a first edge pixel count threshold. Next, at least some of the rectangular region is selected as a second subset. Then, edge magnitude pixels are computed at a plurality of positions within the several horizontal stripes, followed by computing a second count of edge magnitude pixels by counting how many edge magnitude pixels have an edge magnitude that exceeds a second magnitude threshold, and then followed by determining whether the second count exceeds a second edge pixel count threshold so as to determine whether the candidate start region is interesting. In an illustrative embodiment, edge magnitudes are computed using a Roberts Cross edge detector.

The invention provides a general method for omni-directional finding of bar code symbols, as well as many other symbol types in an image of an object. In a particular embodiment, the invention finds bar code symbols, postal code symbols, and various two-dimensional (2D) symbologies such as PDF417, RSS, DataMatrix, and MaxiCode, regardless of the orientation of the symbols in the image of the object. In an illustrative embodiment, the invention finds bar code symbols and other symbols printed on labels of packages being conveyed on a moving belt.

The present invention makes omni-directional finding of bar codes and other symbols in machine vision images more efficient and robust. The invention is an orientation-independent, non-pattern-based search method for finding symbols of any type in an image of an object. More generally, it can be used to find images of objects, or regions of images, whenever they have characteristic local properties (such as a particular texture, periodicity, or wavelet decomposition) without using a trained pattern. Thus, both the shape of the object sought, and the orientation of the object sought, need not be known a priori.

The invention provides enhanced ease-of-use and a wider range of applicability compared to known methods, since there is no need to specify either the symbology or the orientation of a particular symbol prior to use. This allows the user interface to be as simples as a single "decode" button, with no need for adjustment of parameters, for example. Due to various computational efficiencies inherent in the method, the invention makes locating bar codes and other symbols more robust and faster than known methods.

The invention is advantageously incorporated within an easy-to-use handheld symbol scanner, or included as one of many capabilities provided by a general purpose machine vision system. When used in a handheld symbol scanner, the invention would be especially useful for rapid location prior to decoding of a variety of symbologies as may be found on mail pieces and packages handled by common carriers, for example. Such a scanner would also be useful for inventory control and checkout scanning, as well as for use by consumers checking prices in stores.

BRIEF DESCRIPTION OF THE DRAWING

The invention will be more fully understood by reference to the detailed description, in conjunction with the following figures, wherein:

FIG. 5 is a chart showing a Roberts Cross edge detector and chart of derived values;

FIG. 12 shows a candidate start region and scan lines.

DETAILED DESCRIPTION

The method according to the present invention performs omnidirectional finding of bar codes and other symbols in an image and is particularly useful when high speed is required, or when multiple types of symbols are present in the image. The invention uses the characteristic appearance of the encoded data signal of the symbol to locate the symbol. The invention enables finding symbols such as bar codes, stacked bar codes, postal codes, and 2D codes including arrays of bars, squares, hexagons, or other polygons.

Figure 1:
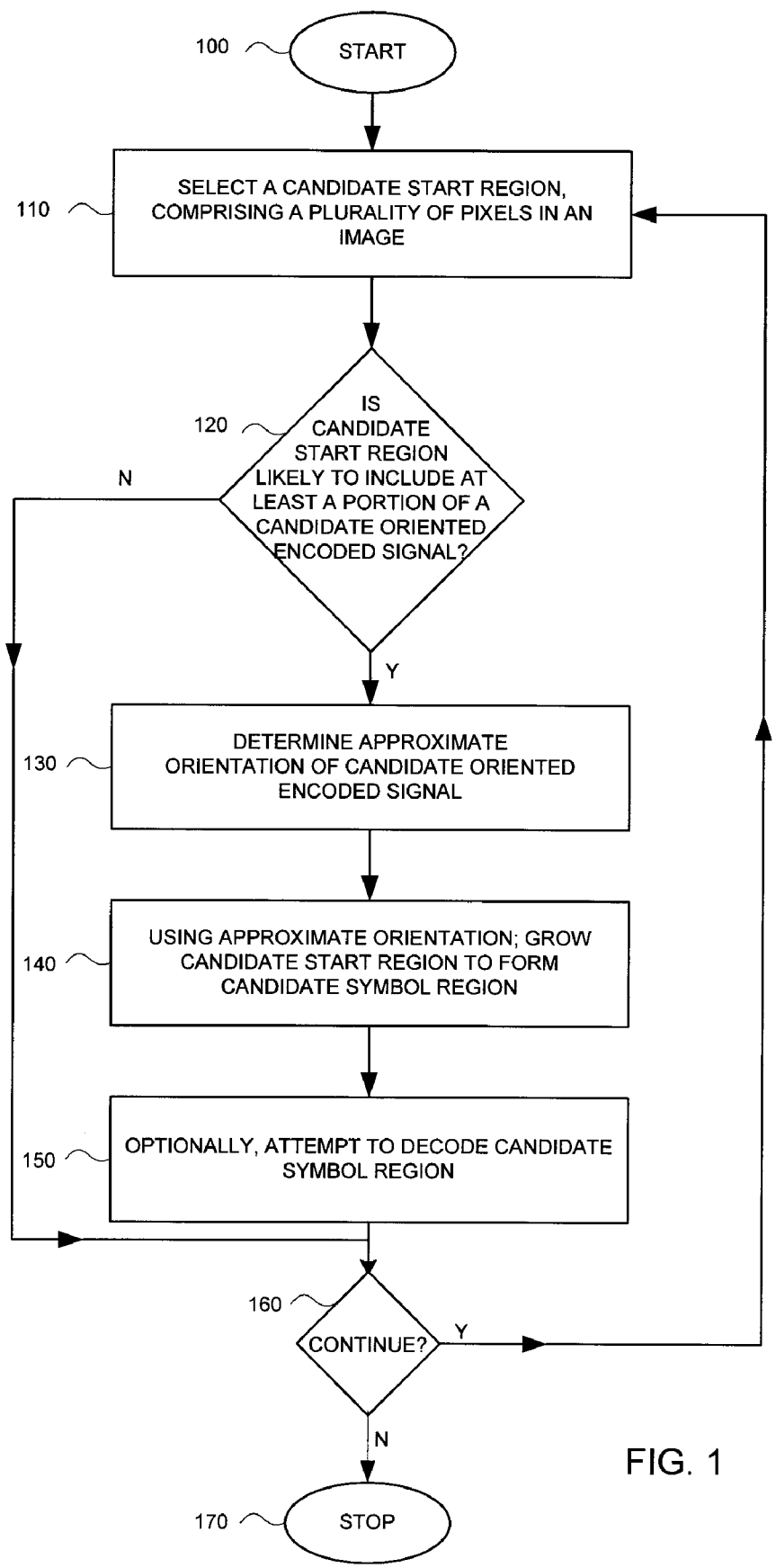
FIG. 1 is a flow chart showing a general method of the invention.
Figure 2A:
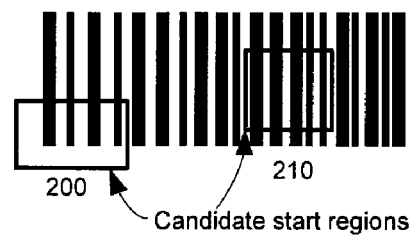
FIG. 2A is a bar code showing candidate two candidate start regions.
Figure 2B:
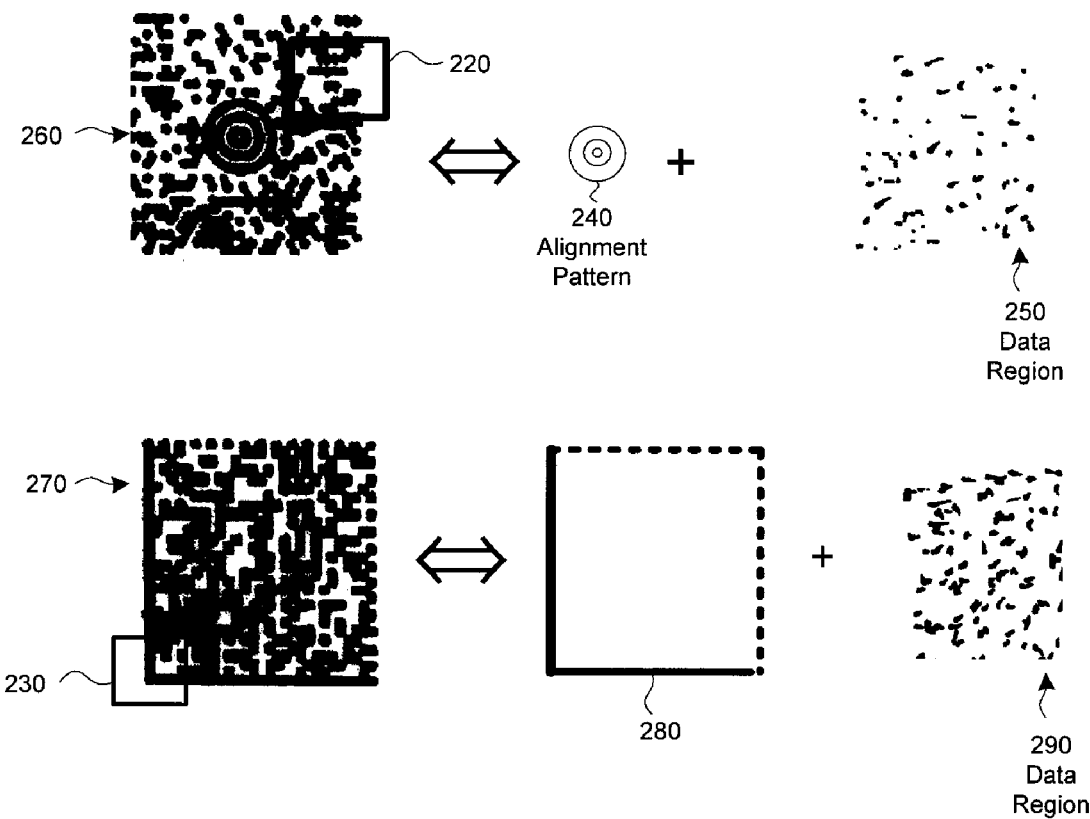
FIG. 2B shows two 2-D symbols, with respective candidate start regions, alignment patterns, and data regions.

Steps in the method for omnidirectional finding of symbols in an image are shown in FIG. 1. The process begins at step 100, and proceeds to step 110, where a candidate start region (e.g., 200 of FIG. 2A) is chosen from the image. In one embodiment, the entire image is conceptually divided into tiles of a fixed size, and each tile (or every other tile) in turn is chosen as a candidate start region. In another embodiment, a user might specify a point in an image where a symbol is likely to appear, and the candidate start region could be chosen as a set of pixels near that point. It is usually convenient to choose a rectangular region of the image as a candidate start region, although any set of contiguous pixels is possible. Other example candidate start regions 210, 220, and 230 are shown in FIGS. 2A and 2B.

In step 120, a determination is made as to whether the candidate start region is likely to include at least a portion of a candidate oriented encoded signal. The signal must have a predominant local orientation for detection by the present invention; the orientation may exist at a highly local level (e.g., a dominant edge gradient angle determined using a small-kernel edge detector), or at a slightly larger scale (e.g., a dominant angle determined using FFT or wavelet analysis of a relatively small enclosing region). Most commonly, the bars of a bar code or the squares or hexagons of a 2-dimensional (2D) symbol produce a dominant gradient orientation. In other cases, a symbol printed using dot-matrix or similar technology (e.g. with disconnected circular printing elements) might have a relatively uniform gradient angle distribution but still have a sharp peak at a specific set of angles in an FFT of the nearby region.

Figure 3:
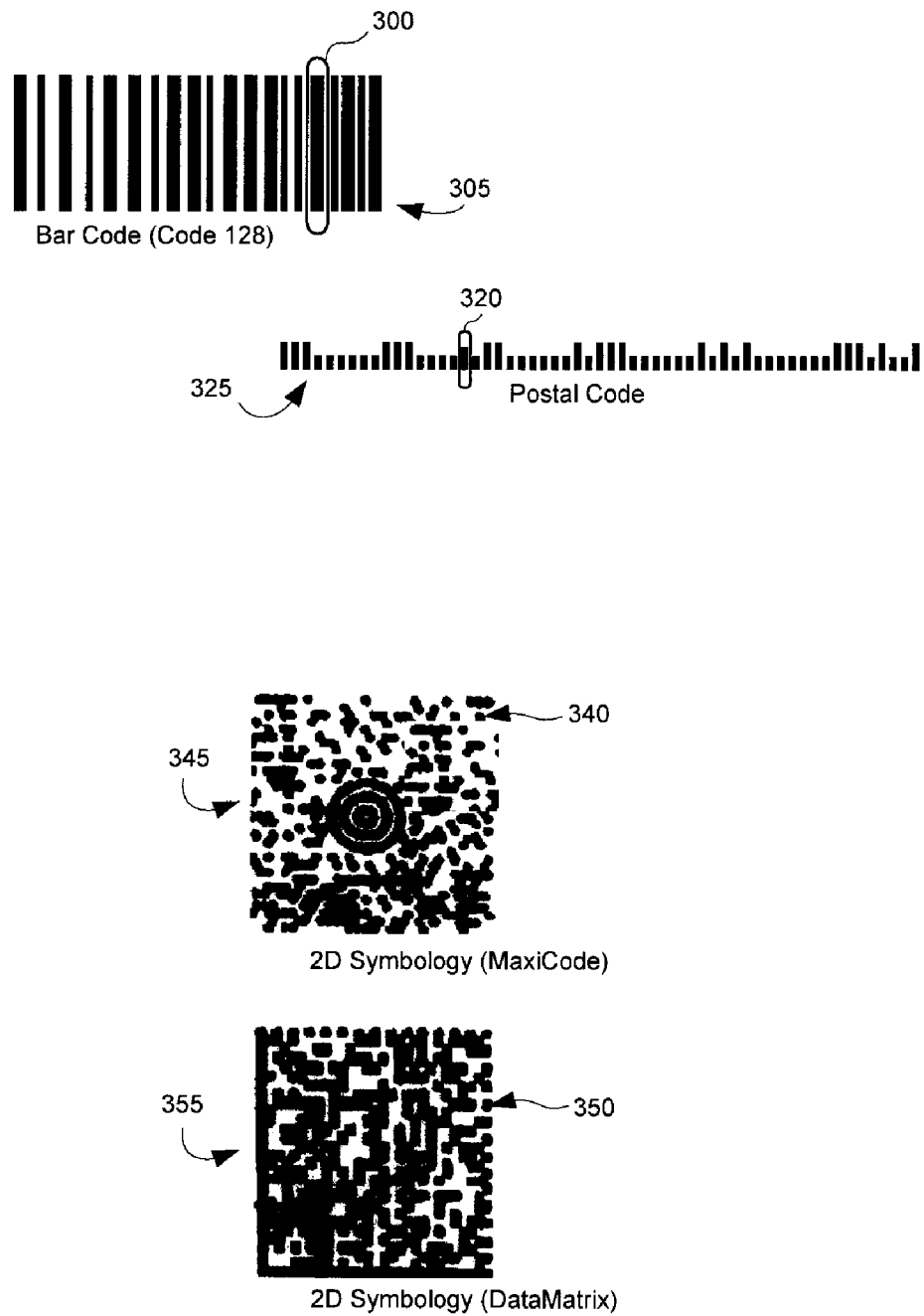
FIG. 3 is a sample collection of four symbol types, showing a module of the respective data region of each symbol type.

Note that the orientation of the signal is an orientation that can be determined by examining a region containing a relatively small number of modules of the symbol. In particular, note that the overall orientation of, say, the symbol's bounding box is not the orientation of interest. Example modules are shown in FIG. 3; bar 300 is a module of a bar code 305, bar 320 is a module of a postal code 325, hexagon 340 is a module of a 2D MaxiCode symbol 345, and square 350 is a module of a 2D DataMatrix symbol 355.

If, in step 120, the candidate start region was determined to be likely to include at least a portion of such a candidate oriented encoded signal, then processing continues to step 130, where the approximate orientation of the signal is determined; otherwise, processing continues with step 160. Note that most symbols of interest have an approximate rotational symmetry of the encoded signal. Such symbols are considered oriented even though one might speak of two or more possible orientations (e.g. whether a bar code was oriented at 10 degrees or 190 degrees). The approximate rotational symmetry of a signal may be modified by the presence of skew or perspective in the imaging process. For example, a typical 2D DataMatrix symbol, comprised of square modules, would have four dominant angles spaced approximately 90 degrees apart (one for each of the edges of the square modules). A DataMatrix symbol with an orientation of 20 degrees would thus have dominant angles near 20, 110, 200, and 290 degrees. If such a symbol were printed on a package label and viewed by a camera whose axis was not perpendicular to the package surface, then the symbol would appear skewed or even perspective-distorted, and the dominant angles might become 20, 140, 200, and 230 (the pairs of angles are approximately 180 degrees apart, but with a spacing other than 90 degrees between the two pairs).

Processing then continues with step 140, where the candidate start region is grown to form the candidate symbol region, using the approximate orientation determined in step 130 to guide the region growing process. The candidate symbol region encloses the entire candidate symbol, and it includes at least a portion of the candidate start region.

In typical use of the present invention, processing will proceed to step 150, where an attempt is made to decode the symbol or symbols contained within the candidate symbol region. Techniques for such decoding are known to those skilled in the art. A reference decode algorithm for each specific symbology are usually given in the standards documents which define those symbologies, e.g. "ANSI/AIM BC1-1995, USS —Code 39" for the bar code symbology known as Code 39 or "ANSI/AIM BC11-ISS—DataMatrix" for the 2D symbology known as DataMatrix. In order to decode a symbol whose symbology is not known in advance, various techniques for symbology autodiscrimination are possible and known to those skilled in the art. One possibility is simply to try assuming that the symbol belongs to each of the set of possible symbologies in turn, and to attempt the specific decode algorithm for the symbology being attempted, until either the symbol is decoded or all symbologies have been attempted. Some additional possibilities will be discussed below. The decoded information might then be used in a variety of ways. For example, if the symbol is on a label of a package, the decoded information might allow determining the proper destination for the package, for example within a warehouse or in a mail handling facility.

In step 160, a decision is made whether to continue looking for additional symbols, in which case processing continues with selecting another candidate start region in step 110; otherwise, processing stops at step 170. The method for making this decision may vary widely by application. For example, processing might continue until a specified number of candidates were found, or until a specified number of symbols were successfully decoded. Alternatively, to perform an exhaustive search of an image, the image could be split into a set of tiles of uniform size, and each tile would be used as a candidate start region; thus, processing would continue until every such tile had been considered as a candidate start region. Yet another possibility would be to continue processing additional regions until a specified amount of time had elapsed or until some other external event occurred (e.g. a package passed a certain checkpoint on a conveyor belt). Many other possible techniques for making the decision whether to continue will occur to those skilled in the art, and the examples given are meant to be illustrative rather than restrictive.

Dividing an image into tiles of a uniform size and treating each tile as a candidate start region provides a simple and robust approach to choosing candidate start regions, so that no potential signal will be missed. The optimal size of the tile depends primarily on the expected range of signal densities and range of symbol sizes. In many applications, using tiles that are 32×32 pixels works well. For some applications, it is desirable to increase the search speed while allowing some potential degradation in robustness. In such applications, using a checkerboard scan pattern of the tiles provides a substantial increase in speed but without substantially increasing the chance of missing a symbol, especially if very small symbols are unlikely to be present. In a checkerboard scan pattern, every other tile is used as a candidate start region, with rows of tiles being staggered. In other words, if the tiles are labeled by integer grid coordinates x and y, then a tile is treated as a candidate start region if and only if (x+y) mod 2 ==0. Those skilled in the art will appreciate that a wide variety of other partial scan patterns are also possible and within the scope of the present invention. For example, using the selector rule (x+y) mod 3 ==0 produces a sparser "one on, two off" scan pattern. One can also use "brick" tile grids, with each tile row shifted by half a tile width relative to the previous one. The choice of scan pattern depends on the desired fraction of coverage, the minimum expected symbol size, and potentially on the most likely symbol orientations. For example, the standard checkerboard is least likely to miss symbols whose bounding box is primarily horizontal or vertical, and more likely to miss very short symbols that are oriented at nearly 45 degrees. Nevertheless, the standard checkerboard is a good choice for many applications.

A significant benefit of the present invention is that it enables omnidirectional finding of symbols using only a knowledge of the general structure of encoded data, without detailed knowledge of any of the encoding schemes used for specific symbologies. For example, each bar code symbology (e.g. Code 39, Code 128, or UPC/EAN) typically has a specific set of bars, called a start/stop character or a delimiter, that will occur at one or each end of a bar code belonging to that symbology. Each two dimensional symbology usually has an alignment pattern, also called a finder pattern, that is present in each symbol of that symbology, independent of the data being encoded in that particular symbol. For example, DataMatrix has a square finder pattern, where two edges of the square are one-module-wide black lines and the other two edges are composed of alternating black squares and white squares. FIG. 2B depicts that MaxiCode symbol 260 includes an alignment pattern 240 and a data region 250, and that DataMatrix symbol 270 includes an alignment pattern 280 and a data region 290. Using the present invention, these details do not need to be known about each symbology to find symbols belonging to that symbology, thus enabling more flexible and robust location.

Examples of symbols belonging to a few symbologies are shown in FIGS. 2A and 2B; many other symbologies exist and more will be invented as time goes on. Although the specific rules for encoding data into any given symbology vary, and although some sets of rules are fairly complex, the general structure of the encoded data signal has a fairly simple form for each symbology, and there is a commonality to the various structures across symbologies. Each symbology encodes data using elements that have a simple form (such as a bar, square, rectangle, or hexagon) laid out in a certain spatial arrangement (such as a set of parallel lines, a square grid, or a hexagonal grid). The data are encoded by setting each element in the arrangement to either black or white, using encoding rules for the specific symbology. It is also possible to have symbologies with more than two possible values (black or white) per element. The regular spatial arrangement of simple shapes used by a wide variety of symbologies has a characteristic signature that is readily detected by the method of the present invention.

There are many possibilities for techniques to determine whether a candidate start region is likely to include at least a portion of a candidate oriented encoded signal in step 120.

Figure 4:
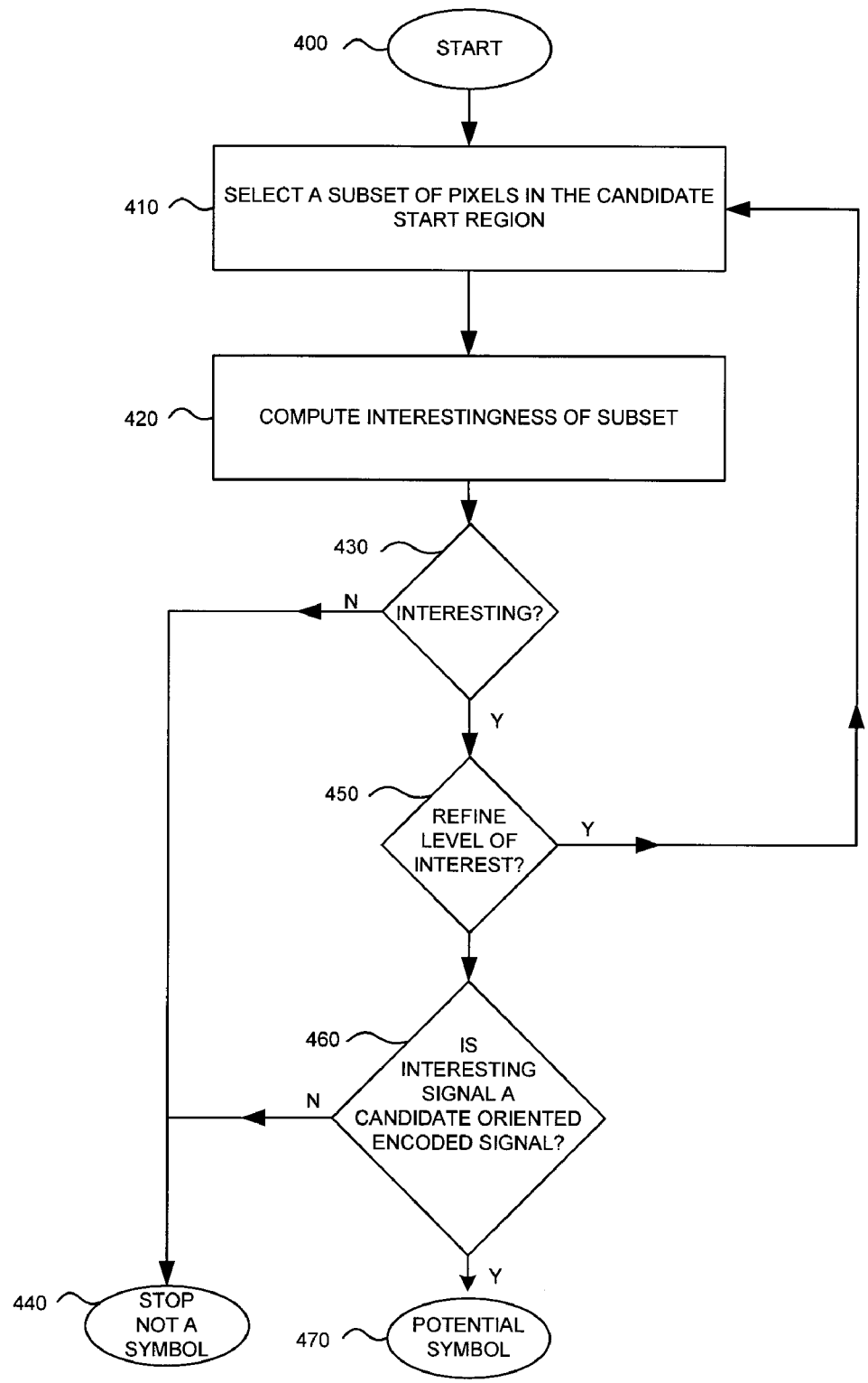
FIG. 4 is a flow chart showing a method for determining whether a candidate start region is likely to include at least a portion of a candidate oriented encoded signal.

In an illustrative embodiment, the present invention allows performing this determination quickly and robustly, as shown in FIG. 4. The process starts with step 400 and proceeds to step 410, where a subset of pixels from the candidate start region is selected. The subset should be chosen to be small enough to be processed quickly, but large enough to be representative and to contain enough information for signal detection. In typical applications, the subset might contain 20%–50% of the pixels of the candidate start region; note that the subset could also be the entire candidate start region.

In step 420, the "interestingness" of this subset is computed. The metric of interestingness discriminates against regions of the image that are highly unlikely to include oriented signals; one example metric is the number of edges with magnitude above a given threshold, and another is the standard deviation of the gray level histogram. Various metrics of interestingness are possible and within the scope of the present invention. Usually, the metric is chosen such that it can be quickly computed, and such that it eliminates most regions that do not contain a signal of interest without rejecting regions that might contain a signal of interest. In other words, the metric should be fast, have a very low false reject rate, and have a reasonably low false accept rate. For speed, the metric often simply discriminates blank from non-blank regions, instead of specifically trying to detect oriented signals.

In step 430, a decision is made as to whether the subset is sufficiently interesting to warrant further examination; this decision usually consists of comparing the measure of interestingness to a threshold. If the subset is sufficiently interesting, processing continues with step 450; otherwise, the candidate start region does not contain a candidate encoded signal, and processing stops with step 440.

In step 450, a decision is made regarding whether to continue refining the level of interest. This decision may be made in a wide variety of ways, all of which are within the scope of the present invention. Often, this step serves as an opportunity for speed optimization, where a substantial number of candidates can be eliminated from further consideration for relatively little computational cost. Usually, successive refinement stages are progressively more discriminating (i.e., have a lower false accept rate). The technique used to make this decision will vary from application to application, depending on such things as the application's requirements for speed (e.g., average number of megapixels processed per second) and the cost of false rejects (e.g., how expensive it is to sort a package manually if the bar code on that package is not found and decoded). If the interest level is to be refined, processing continues with step 410, using another subset of pixels and another interestingness metric. Typically, the new subset will be at least as large as the current subset, in order to make a more accurate estimate of the level of interest. If, on the other hand, the level of interest does not need to be refined further, processing continues with step 460.

A decision as to whether the interesting signal is a candidate oriented encoded signal is made is step 460. If so, processing continues with step 470 (or step 130, in the context of FIG. 1); otherwise, processing stops with step 440 (or continues with step 160, in the context of FIG. 1). In an illustrative embodiment, this decision is made by an analysis of a histogram of edge angles, as discussed below.

Many techniques are possible for determining the level of interest in steps 410–450, and all are within the scope of the present invention. In an illustrative embodiment, the number of pixels whose edge magnitude exceeds a given threshold is used to determine whether the candidate start region contains a sufficiently interesting signal. In another illustrative embodiment, the speed of this decision is optimized using a two-stage approach, where the first stage uses only an approximation of the edge magnitude. In order to both increase speed and to be sensitive to very high-frequency signals, this illustrative embodiment uses the Roberts Cross edge detector, which uses a 2×2 pixel kernel and is well known in the art, to perform edge detection. The use of other edge detectors is also possible and within the scope of the present invention.

The Roberts Cross edge detector kernel and related formulas are shown in FIG. 5. This edge detector uses the two diagonal gray level differences $\Delta_1 = b-c$ and $\Delta_2 = d-a$ in a 2×2 pixel region to compute the gradient magnitude $\mu$ and gradient angle $\theta$ of the image at the center of the 2×2 grid. For efficiency, these values are usually quantized to 8-bit integer values to form the quantized gradient magnitude m and quantized gradient angle t, respectively, and stored as magnitude and angle images; the magnitude is typically rounded and then clipped to the maximum value of 255 if necessary. Note that the gradient magnitude and gradient angle are also sometimes referred to as the edge magnitude and edge angle, respectively.

In many applications, edges with a gradient magnitude below a certain magnitude threshold $m_{thresh}$ should be ignored. In such cases, it can be a significant speed and memory advantage to form and use only the masked quantized edge angle $t_m$ and the corresponding masked angle image instead of using m and t and the corresponding separate magnitude image and angle image; the speed advantage results from having to access the pixels of only a masked angle image instead of the pixels of both a magnitude image and an angle image and from having to use fewer conditional statements. For efficiency, the values of $t_m$ as a function of $\Delta_1$ and $\Delta_2$ may be pre-computed and stored in a lookup table to avoid the expense of computing a square root and an arctangent. It is usually sufficient to use only the upper 7 bits of $\Delta_1$ and $\Delta_2$ to reduce the look-up table size so that it may efficiently remain in a processors level 2 cache. Another efficient alternative to using a table lookup is to use the CORDIC algorithm to compute the magnitude and angle, as is well-known in the art.

Figure 6:
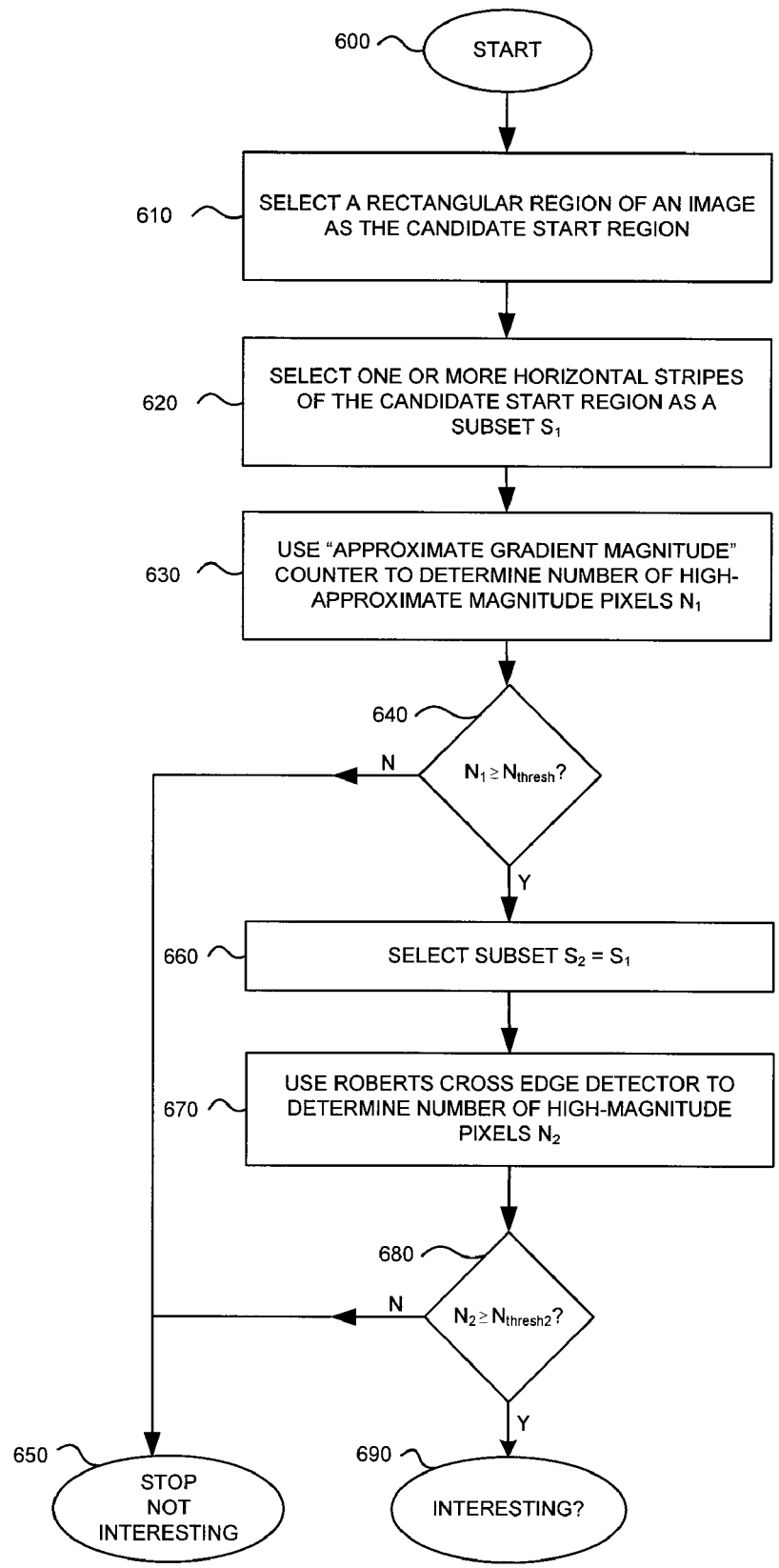
FIG. 6 is a flow chart showing determination of interestingness in FIG. 4.
Figure 7:
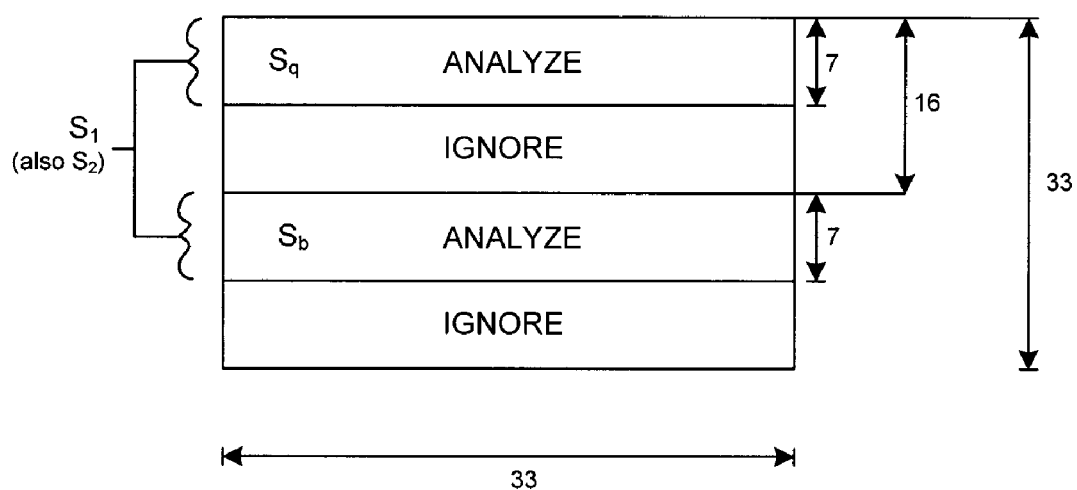
FIG. 7 shows a subset of a candidate start region, including two horizontal stripes.

The determination of interestingness for steps 410–450 is shown in detail for an illustrative embodiment in FIG. 6. The illustrative embodiment uses two successive measurements of interest, both related to the Roberts Cross edge kernel. The determination begins in step 600 and proceeds to step 610 (corresponding to step 110 of FIG. 1), where a rectangular window of an image is chosen as the candidate start region R. Then, in step 620, a subset of pixels $S_1$ is chosen to include one or more horizontal stripes in R. FIG. 7 shows a subset $S_1$ including two stripes $s_a$ and $s_b$, each of which includes seven rows of 33 pixels each, where the region R is 33×33 pixels. Note that each 7×33 stripe of source image pixels will become a 6×32 stripe of corresponding masked quantized edge angle pixels because of erosion by the 2×2 Roberts Cross kernel; the rightmost and bottommost pixels are eroded away.

After selection of subset $S_1$, the "approximate edge magnitude" M is computed for each source kernel position (there being 2×6×32 such positions in the example above). The approximate edge magnitude, which is just the sum of the absolute values of the two gray level differences $\Delta_1$ and $\Delta_2$, is used instead of the exact magnitude, which is the square root of the sum of the squares of the two gray level differences, because such an approximate magnitude can be computed significantly faster than the exact magnitude but still provides substantial discriminating power. The number of pixels $N_1$ with a value of the approximate magnitude greater than or equal to an approximate magnitude threshold $M_{thresh}$ is then computed; the region is considered sufficiently interesting if $N_1$ exceeds a pixel count threshold $N_{thresh}$. The pixel count threshold is chosen so that a desired signal will almost certainly exceed the threshold. For example, a reasonable expectation for a good bar code candidate is that a minimum of one element (e.g. a bar with two edges, one white-to-black and the next black-to-white) should pass through the start region; this is clearly a very conservative minimum, designed to make sure that no potential bar codes escape further examination. Using this expectation, one would set $N_{thresh}$ equal to twice the width or height of the region, adjusted for the fractional coverage of $S_1$ in $R_1$; in the above example, one might set $N_{thresh}$ to 2*(2*6), i.e. two full lines passing through the magnitude-detected part of $R_1$. Clearly, there are many other possible ways to select the pixel count threshold, and all are within the scope of the present invention. For many applications, a suitable value for $M_{thresh}$ is 14.

If $N_1 \geq N_{thresh}$, then the region is considered initially interesting, and processing continues with step 660; otherwise, the region is considered not interesting, and processing stops with step 650 (or continues with step 440, in the context of FIG. 4). In this illustrative embodiment, the level of interest is refined using the exact (but quantized) Roberts Cross edge magnitude. In step 660, subset $S_2$ is chosen to be identical to $S_1$, although it would be entirely reasonable to choose $S_2$ differently, such as making it the entire region R, or making it the part of R not included in $S_1$. Processing then continues with step 670, where the number of pixels whose quantized Roberts magnitude exceeds a magnitude threshold $m_{thresh}$ is determined. If this number $N_2$ equals or exceeds a second pixel count threshold $N_{thresh2}$, then the region is still considered interesting, and processing stops with step 690 (or step 470, in the context of FIG. 4); otherwise, the region is no longer considered interesting, and processing stops with step 650. Again, there are many ways to choose the threshold $N_{thresh2}$; in the illustrative embodiment, a reasonable and conservative choice is to set $N_{thresh2} = N_{thresh}$, corresponding to expecting the same amount of detectable signal but using the more precise magnitude measurement. For many applications, a suitable value for $m_{thresh}$ is 10. Note that roughly corresponding values of $m_{thresh}$ and $M_{thresh}$ are related by $M_{thresh} = 1.3 * m_{thresh}$, assuming uniformly distributed angles, or at worst $M_{thresh} = 1.41 * m_{thresh}$ for predominantly 45 degree angles.

Figure 8:
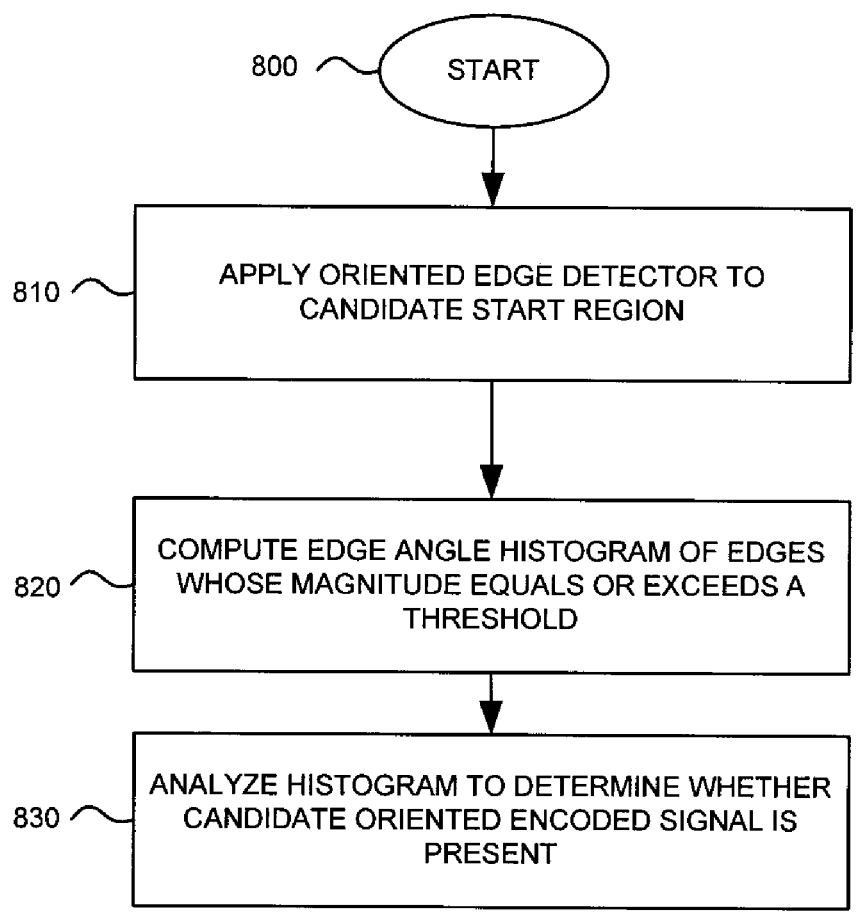
FIG. 8 is a flow chart showing a method for determining whether a candidate oriented encoded signal is present.

If the candidate start region is considered sufficiently interesting, then it merits a more detailed analysis to determine whether it is likely to contain a candidate oriented encoded signal. In an illustrative embodiment, this determination is made by analyzing an edge angle histogram of the candidate start region. In FIG. 8, processing begins with step 800 and proceeds to step 810, where an oriented edge detector is applied to the candidate start region. The oriented edge detector produces the gradient magnitude and gradient angle at each pixel in the candidate start region (as eroded by the edge detector kernel); this information is typically stored as a magnitude image and an angle image. Processing then continues with step 820, where an edge angle histogram is formed by counting the number of angles with each possible angle value, counting only those angles where the corresponding magnitude equals or exceeds a specified magnitude threshold. Then, in step 830, the edge angle histogram is analyzed to determine whether a candidate oriented encoded signal is present. In a particular illustrative embodiment, the Roberts Cross edge detector is used as the oriented edge detector. It can be particularly efficient to construct a variant of the Roberts Cross edge detector that produces only a masked (magnitude-thresholded) angle image instead of separate magnitude and angle images; in the masked angle image, a special angle value (e.g. 255) is used to indicate an angle whose magnitude did not meet the specified magnitude threshold; high-magnitude angles that happen to equal the special value are assigned to an adjacent value (e.g. 0 or 254). A significant source of the efficiency of this approach is that it substantially decreases the memory bandwidth required both to produce and to analyze the gradient information, since only one image is produced instead of two (masked angle image vs both magnitude image and angle image). Also note that it is particularly efficient that the Roberts Cross edge detector is also used as part of the measure of interest, since the amount of additional work required is decreased if the signal is interesting.

A variety of techniques can be used to perform the angle histogram analysis, as is known to those skilled in the art. It is particularly useful to note that the symbols of interest usually consist of parallel bars, or of squares or hexagons at a fixed common orientation. The angle signature of parallel bars consists primarily of two peaks that are approximately 180 degrees apart (e.g. one peak at 35 degrees and one peak at 215 degrees), with one peak indicating a set of light-to-dark transitions and the other a set of dark-to-light transitions. Similarly, the angle signature of a set of aligned squares ideally consists of four peaks approximately 90 degrees apart, and the angle signature of a set of aligned hexagons ideally consists of six peaks approximately 60 degrees apart.

In some applications, symbols may be substantially skewed; in such cases, parallel bars still appear as two peaks 180 degrees apart, but squares will appear as parallelograms and will thus have two sets of two peaks, where each set is a pair of 180-degree-separated peaks but the two pairs are not spaced by 90 degrees. For example, whereas an unskewed set of squares might yield peaks at 35, 125, 215, and 305 degrees, a skewed set might yield peaks at 35, 150, 215 (=35+180), and 330 (=150+180) degrees. Note that the amount of skew can thus be determined from the set of peaks (in this example, the skew is 25 degrees).

In other applications, symbols may also be perspective distorted; for example, the symbols might be printed on labels applied to packages, and the camera axis might not be perpendicular to the package surface. For mild perspective distortion, the symbol can be treated as though it were simply skewed as described above. For cases of perspective distortion where there is significant keystone distortion, the peaks in each peak pair may no longer be separated by approximately 180 degrees, since the two sides of a bar will no longer appear parallel.

Figure 9:
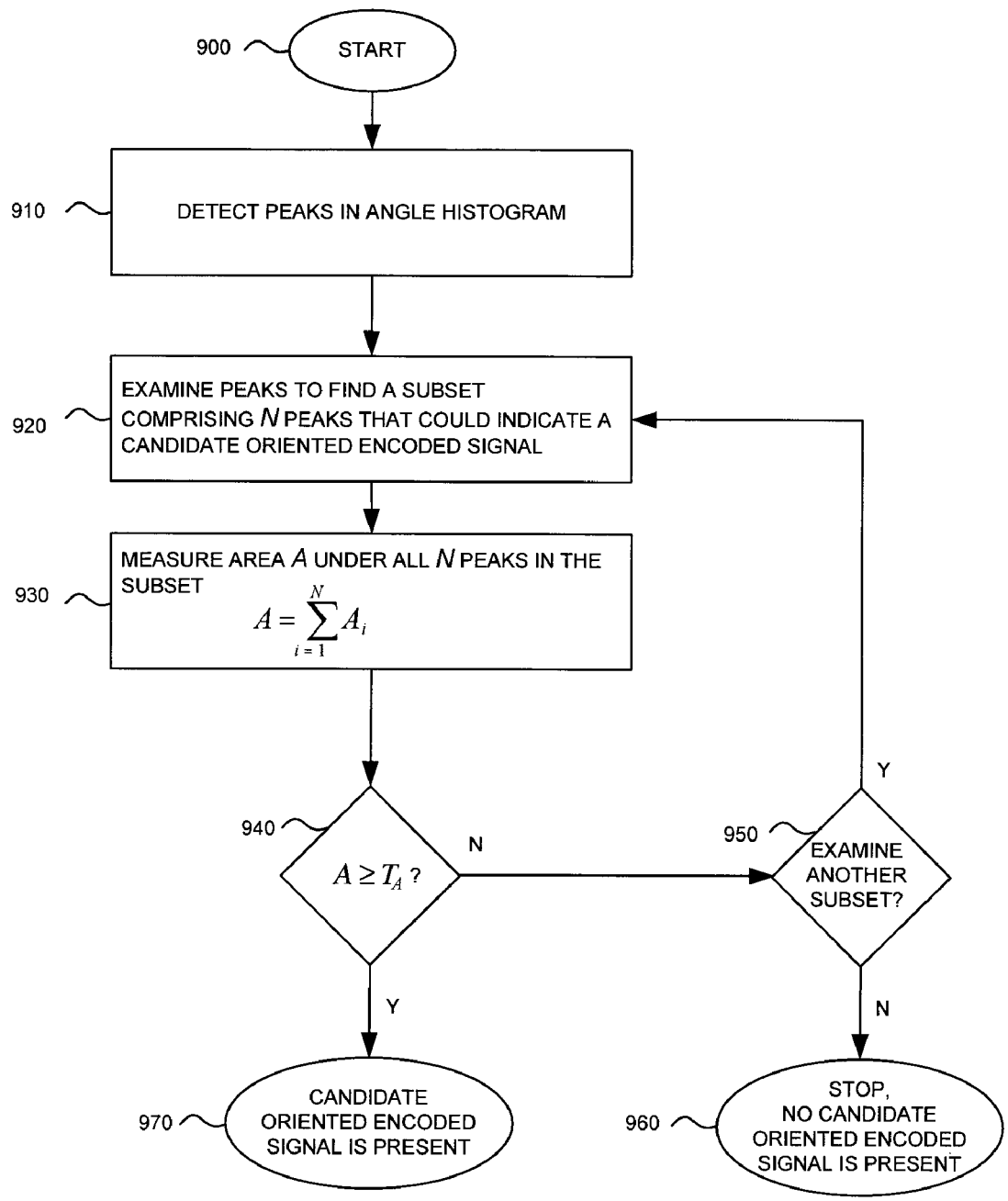
FIG. 9 is a flow chart showing a method for angle histogram analysis.

One type of angle histogram analysis for an illustrative embodiment is shown in FIG. 9. The analysis begins with step 900 and proceeds to step 910, where peak detection is performed on the angle histogram. Peak detection may be performed in a variety of ways. It is often advisable to locally average the histogram, since angle histograms tend to be fairly noisy; for example, if the full histogram contains 256 bins, with each bin corresponding to an angle range of approximately 1.4 degrees, then an averaged histogram of 64 bins might be formed by averaging groups of 4 bins (i.e., an angle range of approximately 5.6 degrees). It is also important to realize that an angle histogram should be considered circular; in the above example, full histogram bin 255 should be considered adjacent to full histogram bin 0, and averaged histogram bin 63 should be considered adjacent to averaged histogram bin 0. When using the variant edge detector discussed above that produces a masked angle image, one can simply zero out the full histogram bin corresponding to the special low-magnitude angle (e.g., 255) before performing the averaging.

Even the averaged histogram may be relatively noisy and contain spurious local maxima. In such cases, nearby local maxima should be clustered together and considered part of the same peak. For example, one might begin by sorting all local maxima in descending order by the histogram bin count, and then for each local maximum in turn, considering all nearby bins (e.g., those within plus or minus 22.5 degrees) with a bin count up to, e.g., 50% of the local maximum bin count to be part of that peak. This is only one of many possible techniques for performing peak detection, and many others are also known to those skilled in the art.

Once peak detection has been performed, the analysis proceeds to step 920, where the set of peaks is examined to try to find a subset of peaks that could indicate the presence of a candidate oriented encoded signal. For example, as discussed previously, a subset comprising two peaks that are approximately 180 degrees apart may indicate the presence of a signal composed of parallel bars, and a subset comprising four peaks that are approximately 90 degrees apart may indicate the presence of a signal composed of commonly oriented squares. Under some circumstances, not all of the expected peaks may appear in the histogram of a given candidate start region. For example, it is particularly common in the case of hexagonal elements that only two or three peaks, spaced at multiples of 60 degrees, are visible in a given small region, both because a given region may not have all directions present and because some of the peaks may be too blurry to detect reliably. In the case of square elements, sometimes only three of the four peaks will be apparent. It is also common for additional peaks to occur that are not part of the signal of interest, such as when there are other artifacts or objects in the image in the candidate start region, or when the boundary of the symbol is visible. Thus, when finding a subset of peaks that could indicate the presence of a candidate oriented encoded signal, it is ordinarily desirable to allow the formation of subsets that are incomplete (e.g., contain only three of the six expected hexagon peaks) or that overlap with other peaks that are not in the subset.

Once a candidate subset of peaks is formed, it must still be determined whether the collective strength of that subset of peaks is sufficient to be considered a candidate oriented encoded signal. Thus, the histogram analysis continues with step 930, where the total peak area A underneath all the peaks in the subset is computed. In step 940, this total peak area A is compared to a total area threshold $T_A$; if A is greater than or equal to $T_A$, then the subset of peaks is strong enough to be considered sufficient evidence of the presence of a candidate oriented encoded signal, and the analysis stops with step 970 (or step 470, in the context of FIG. 4). If A does not meet the threshold, then a decision is made whether to consider another subset of peaks as a candidate subset in step 950. Usually, all possible subsets can be considered in turn, since the number of peaks is small (typically at most five or six, and often only two or three). If another candidate subset is to be considered, the analysis returns to step 920 to choose that next subset; otherwise, the histogram does not indicate the presence of a candidate oriented encoded signal, and the analysis stops with step 960 (or step 440, in the context of FIG. 4).

When using a form of histogram analysis such as that just described, it is then straightforward to determine the approximate orientation of the candidate oriented encoded signal (step 130). For a bar code, one can simply use the direction of one of the two peaks as the signal orientation; note that the orientation of a bar code is only meaningful modulo 180 degrees. One might also compute the "average" of the two angles, being careful to take the 180 degree difference into account; in other words, one would use the angular mean of $\theta_1$ and ($\theta_2$–180 degrees). For more complex codes without skew or perspective distortion, one may similarly simply choose one peak (or a suitable "average" of the peaks in the subset) to use as the orientation of the signal. In the presence of skew, the orientation is more properly considered to be a set of two angles, one for each axis of the plane. For the purpose of determining orientation, perspective orientation is most easily treated as approximately being a skew.

For example, if the two histogram peaks for a bar code are found at 10 degrees and 195 degrees, then that bar code could simply be considered to have orientation 10 degrees by choosing one peak, or to have orientation 12.5 degrees by "averaging" the two values. If the four histogram peaks for an unskewed square are found at 10, 100, 190, and 280 degrees, the orientation is 10 degrees; more generally, the orientation might be called the pair or angles (10 degrees, 100 degrees) to indicate the orientation of both axes. If the four histogram peaks for a skewed square are found at 10, 120, 190, and 300 degres, the general orientation might be called (10 degrees, 120 degrees). Note that a bar code may also be skewed, but such skewing cannot be determined locally.

Forms of histogram analysis other than that just described in the context of FIG. 9 are also possible and within the scope of the present invention. For example, one might perform autocorrelation of the angle histogram, sliding the histogram against itself at all possible angle offsets, being careful to treat the histogram as a circular buffer. Such autocorrelation will produce peaks in the correlation score at angle offsets where the histogram peaks overlap. In particular, the angle histogram of a bar code would have peaks in the correlation score at offsets of zero and approximately 180 degrees, while the angle histogram of a square graphical code would have peaks in the correlation score at offsets of zero and approximately 90, 180, and 270 degrees. It is important to note that such an autocorrelation technique indicates the presence of an oriented encoded signal without directly indicating what the orientation is. The orientation must still be determined by some other technique, such as FFT analysis or a histogram peak analysis, such as described above.

Histogram analysis of an edge angle histogram is only one of many possible techniques for determining the presence of a candidate oriented encoded signal. Other useful techniques include local FFT analysis or wavelet analysis of the candidate start region, as is known to those skilled in the art. For FFT analysis, it is often convenient to analyze square regions, where each side of the square is a power of 2, e.g. 32×32 pixels or 64×64 pixels. For such analysis, it is usually appropriate to choose the candidate start region to be a square of such size, although it is also possible to simply choose such a square that substantially overlaps the candidate start region. Determining whether an oriented signal is present from the FFT can be done by many techniques known to those skilled in the art and is extensively covered in the relevant literature. As a simple example, the presence of substantial peaks in the FFT magnitude space at a particular angle may indicate the presence of an oriented signal. As another simple example, one might measure the principal moments of inertia of the central circular region of the FFT magnitude space; if the two moments are substantially dissimilar (e.g., the larger principal moment of inertia exceeds the smaller principle moment of inertia by, say, 10 percent) then the signal is oriented, and its orientation is given by the angle of the first principal axis.

FFT analysis can be particularly useful when the orientation of the signal is not apparent at the small scale typically detected by oriented edge detectors. For example, if a symbol is printed using disconnected circular dots, then the orientation of the signal would be apparent using FFT analysis, but might not be apparent using histogram analysis of the angles produced by a 2×2 or 3×3 edge detector (since the angle histogram of disconnected circular dots is essentially flat and uniform). Note that if the circular dots substantially overlap, as is more typical of dot-matrix printing, then histogram analysis can still be applied, although the orientation peaks will tend to be less sharp than with other printing technologies. It is important to note that signals whose orientation is less localized, e.g. detectable only by FFT or wavelet analysis instead of by small-kernel edge histogram analysis, are considered oriented signals for the purposes of the present invention.

Note that it is typically preferable to perform a local FFT analysis of a relatively small piece of the image near the candidate start region instead of performing an FFT analysis of the entire image or large portion thereof. In typical applications, the oriented signal will cover only a small fraction of the entire image, and thus its FFT signature will be difficult to detect in an FFT of the entire image unless the rest of the image is blank, or of known and relatively simple content. Because local analysis is preferable, wavelet analysis is a useful alternative to local FFT analysis, as is known to those skilled in the art.

Once it is determined that the candidate start region is likely to include at least a portion of a candidate oriented encoded signal, and once the approximate orientation of that signal has been determined, then the candidate start region is grown, using the approximate orientation, to form the candidate symbol region (step 140 in FIG. 1). The candidate symbol region should contain at least enough of the symbol to potentially allow decoding of the symbol, and it should ordinarily contain substantially the entire symbol in the image. Region growing, a technique well known to those skilled in the art, attempts to identify in an image a region that possesses certain characteristics; in this case, the desired characteristic is that the region is likely to contain a candidate oriented encoded signal sufficiently similar to that found in the candidate start region, including similarity in orientation.

Figure 10:
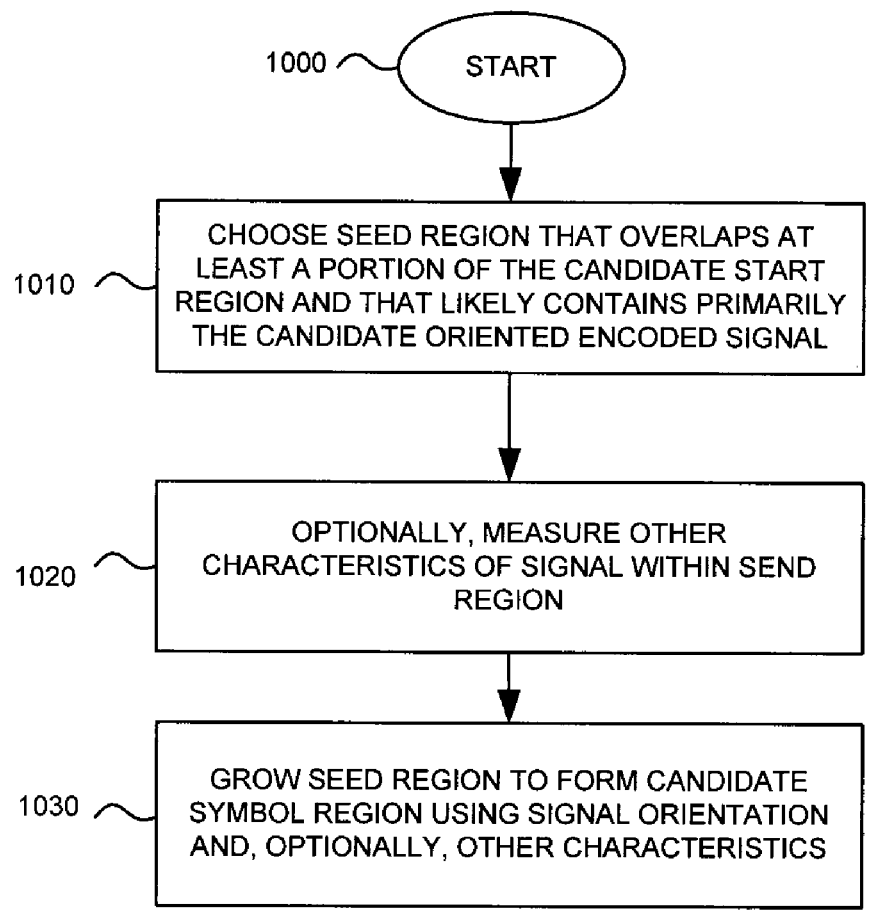
FIG. 10 is a flow chart showing a method for region growing of the candidate start region to form the candidate symbol region.

One approach to region growing of the candidate start region to form the candidate symbol region is shown in FIG. 10. Processing begins in step 1000 and continues with step 1010, where the candidate start region is refined to form the seed region. The seed region should overlap at least a portion of the candidate start region and should be chosen to contain essentially only the candidate oriented encoded signal. In other words, the candidate start region may contain background information that is not part of the candidate oriented encoded signal, and the seed region should be chosen to exclude such non-signal sub-regions.

Figure 11:
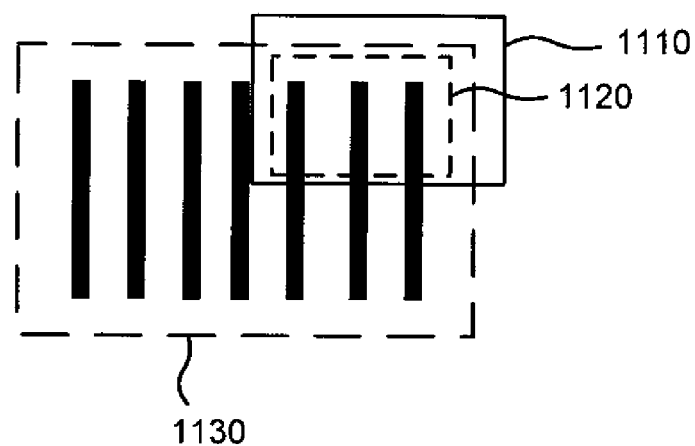
FIG. 11 shows an example bar code with a candidate start region, a seed region, and a candidate symbol region.

FIG. 11 shows an example bar code with candidate start region 1110, seed region 1120, and candidate symbol region 1130. In one illustrative embodiment, the seed region may simply be chosen to be identical to the candidate start region.

In another illustrative embodiment, the candidate start region may be divided into a set of scan lines oriented substantially parallel to the approximate signal orientation (e.g. perpendicular to the bars of a bar code). Edges may then be detected along each scan line, as is known to those skilled in the art; for example, the difference between successive pixels in a scan line may be used to form the derivative of the scan line, and local peaks (maxima or minima) in the derivative are considered to be edges. Scan lines where the edge density (i.e., number of edges per unit length of scan line) exceed a specified threshold may then be considered to be part of the candidate encoded signal, and the candidate seed region is chosen to contain only or mostly those scan lines.

FIG. 12 shows a candidate start region 1210 and scan lines such as 1220; note that the set of "good" scan lines 1230 will determine the extent of the seed region. In yet another illustrative embodiment, the masked angle image region corresponding to the candidate start region is divided into a set of scan lines oriented substantially parallel to the approximate orientation. When progressing along a scan line, only transitions from a gradient angle substantially near the signal angle to a gradient angle near 180 degrees off the signal angle are counted as edges. "Near" might mean, for example, within plus or minus 30 degrees. In this fashion, one can compute the density of only those edges whose direction is compatible with the signal of interest more robustly than one can by treating the scan line as a purely one-dimensional signal. For example, suppose the approximate signal angle is 10 degrees, and the gradient angles encountered at successive locations along the scan line are 10, 12, 195, 190, 250, 240, 194, 8, 11. In this case, there are only two edges of interest: the transition from 12 to 195 and the transition from 194 to 8. In particular, note that the transitions from 190 to 250 and from 240 to 194 are not counted as edges even though there is a substantial change in angle; these positions would likely have been seen as edges by the less discriminating one dimensional edge detection. Also note that a transition should be counted as an edge even if there are intervening unaligned angles; thus, if part of the sequence were 190, 250, 240, 8, then one transition would be counted between the 190 and the 8 despite the presence of the intervening unaligned values. When using a masked angle image, note that the special low-magnitude value (e.g. 255) should be treated as unaligned.

In some applications, once the seed region has been determined, it may be advantageous to measure additional characteristics of the signal in the seed region. Such additional characteristics can then be used as additional constraints for the region growing. Thus, processing proceeds to step 1020, where additional characteristics of the signal within the seed region may be measured. Such characteristics might include the average signal density, and/or the standard deviation of that signal density. The characteristics might also include the signal characteristics along more than one direction; for example, this can allow distinguishing bar codes from 2D codes. Such metrics may also be used to aid in decoding the symbol by substantially decreasing the number of decoders for different symbologies that need to be attempted; for example, if the signal exhibits very uniform spacing between bars, then the signal is probably a postal code rather than a bar code, and thus only postal code decoders need be tried.

Another symbol characteristic that may be very useful for robust region growing is the detailed orientation signature of the signal, e.g. the angle histogram taken as a whole rather than simply a single dominant angle. For example, the two histogram peaks of a bar code are typically much sharper than two similarly oriented peaks arising from a region of text. Similarly, the four peaks of a square-module code such as DataMatrix tend to be sharper than similar peaks that might arise from text. Using these more detailed comparisons of orientation signatures can produce much more robust region growing, and in particular can prevent agglomerating nearby text or other background material into the candidate symbol region. Some prior art techniques use only a few orientation-sensitive kernels, and thus cannot distinguish between dissimilar types of data that happen to have a common orientation. The FFT magnitude image and its peaks may also be used as an orientation signature, as may a 1D FFT along the signal direction (e.g. perpendicular to the bars of a bar code).

Processing then continues with step 1030, where region growing is applied to the seed region to form the candidate symbol region. As is well known in the art, such region growing may be accomplished in a number of ways. For example, the entire image might be subdivided into uniform tiles, with signal orientation computed for each tile, e.g., as though treating each tile as a candidate start region and performing the histogram analysis discussed above. The additional metrics, such as average signal density, might also be computed for each tile. The region growing process would then grow the seed region using adjacent tiles with sufficiently similar properties, e.g. with signal orientation within plus or minus 10 degrees, and signal density within plus or minus 50 percent. Such region growing may also use morphological operations, such as dilation, to close gaps and connect nearby similar regions. Note that the region growing may also be done globally. The optimal size of the tiles depends on the expected range of signal densities and minimum and maximum expected sizes of entire symbols. In many applications, using tiles that are 32×32 pixels works well.

In some applications, it may be more robust and efficient to compute the characteristics of nearby areas on an incremental basis for the region growing, instead of computing the characteristics of local regions throughout most of the image in advance. For such an incremental process, one might begin with the seed region and then examine areas adjacent to the perimeter of the seed region. As new areas are found that are sufficiently similar to the desired characteristics, the symbol region is grown to include them, and the new perimeter is also used to determine new adjacent areas. The region growing process stops when examination of all potential new areas along the current perimeter fails to grow the region. For bar code symbols, this procedure can be made more efficient by trying to grow the region only in the direction perpendicular to the bars. However, because such a procedure does not find the full extent of the bar code along the bars, decoding of the candidate symbol region may then be somewhat less robust, since less redundant signal will be included. One may also use adaptive region growing techniques, e.g. by updating the expected signal orientation to be the angular mean of all the regions added so far.

A simple example of how such incremental region growing with extra characteristics is described for location of postal codes. Postal codes have a particularly simple structure; they are composed of a number of evenly spaced bars of uniform width, with the data being encoded in the varying heights of the bars. Considering the postal codes as one dimensional signals, e.g. by considering their projection onto an axis perpendicular to the bars, or by taking a stripe substantially through the center of the symbol, it is clear that the even spacing of nearly uniform elements is a characteristic which can be used to distinguish postal codes from other symbols and other signals, and from noise. In particular, this structure can be made apparent by using a one-dimensional FFT, or by correlating the one-dimensional signal against itself at successive offsets, both of which techniques are well known to those skilled in the art.

For example, in a one-dimensional correlation, a postal code will have sharp peaks evenly spaced in the correlation score space, with the spacing being approximately equal to the spacing from the center of one bar to the center of the next. To use this characteristic in region growing, the spacing would first be determined using one-dimensional auto-correlation of the seed region. Note that a failure to find strong evenly spaced peaks in the seed region would indicate that the seed region did not contain a postal code. Adjacent areas would then be evaluated by, for example, forming a one-dimensional projection using the approximate signal orientation and performing correlation of that projection with the projection from the original seed region. If strong evenly spaced peaks were found at the expected spacing, then that area would be considered sufficiently similar and would become part of the candidate symbol region. Also note that for postal codes, the direction of growth is almost entirely along the direction perpendicular to the bars, so that areas in the direction parallel to the bars do not need to be examined, after the initial extent of the symbol along the direction of the bars has been determined. Note that the one-dimensional signal of postal codes is not perfectly uniform because of the varying heights of the bars captured by the projection; there may also be more variation in the four-state postal codes than in the two-state codes. This variation may need to be taken into account when determining a threshold to use for the expected correlation score peaks.

Thus, a method has been disclosed for performing fast and robust omnidirectional location of bar codes and other graphical codes for a variety of applications.

A software implementation of the above-described embodiment may comprise a series of computer instructions either fixed on a tangible medium, such as a computer readable medium, e.g. a diskette, a CD-ROM, a DVD, a ROM memory, or a fixed disk, or transmissible to a computer system, via a modem or other interface device over a data communications medium. The medium either can be a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, although an embodiment for reading symbols on the labels of packages was discussed, those skilled in the art will appreciate that the invention can be applied to a great many other applications, such as reading labels on documents, reading UPC product codes at a point of sale, reading symbols on the sidewall of a tire, or reading symbols etched on semiconductor wafers. Use of any such embodiment for the purposes described herein is within the spirit and scope of the invention. Other aspects, such as the specific instructions utilized to achieve a particular function, as well as other modifications to the inventive concept are intended to be covered by the appended claims.

Other variants and embodiments will occur to those skilled in the art, without departing from the spirit and scope of the invention. Accordingly, the invention is not intended to be limited by the detailed description, except as set forth in the following claims.

What is claimed is:

1. A method for omnidirectional location of bar code symbols and other graphical code symbols in an image of an object, each code symbol having an oriented encoded signal, the method comprising:
choosing a candidate start region in the image;
determining whether the candidate start region includes at least a portion of a candidate oriented encoded signal, including:
selecting a subset of pixels, from the candidate start region, having enough information for signal detection;
computing a measure of interest of the subset of pixels for use in eliminating candidate start regions that do not contain a signal of interest, without rejecting candidate start regions that might contain a signal of interest; and
deciding whether the measure of interest is sufficient to warrant further examination of the candidate start region;
determining an approximate orientation of the candidate oriented encoded signal; and
growing the candidate start region, using the approximate orientation, so as to form a candidate symbol region that encloses an entire candidate code symbol, including at least a portion of the candidate start region.

2. The method of claim 1, further including:
deciding whether to locate another code symbol; and
choosing another candidate start region in the image.

3. The method of claim 2, wherein deciding whether to locate another code symbol includes:
determining whether a specified number of candidate code symbols were already found.

4. The method of claim 2, wherein deciding whether to locate another code symbol includes:
determining whether a specified number of candidate code symbols were successfully decoded.

5. The method of claim 2, wherein deciding whether to locate another code symbol includes:
in an image divided into a plurality of uniform tiles, processing until each uniform tile has been chosen as a candidate start region.

6. The method of claim 2, wherein deciding whether to locate another code symbol includes:

processing additional candidate start regions until a specified amount of time had elapsed.

7. The method of claim 2, wherein deciding whether to locate another code symbol includes:
processing additional candidate start regions until an external event occurs.

8. The method of claim 1, wherein choosing a candidate start region in the image includes:
dividing the entire image into a plurality of uniform tiles, and using each tile of a regular pattern of tiles as a candidate start region.

9. The method of claim 1, wherein choosing a candidate start region in the image includes:
specifying a point in the image where a code symbol is likely to appear, and choosing a set of contiguous pixels near that point to serve as the candidate start region.

10. The method of claim 9, wherein the set of contiguous pixels defines a rectangular region.

11. The method of claim 1, wherein determining whether the candidate start region includes at least a portion of a candidate oriented encoded signal includes:
determining a number of pixels in the candidate start region that have an edge magnitude exceeding an edge magnitude threshold; and
comparing the number of pixels to a pixel count threshold.

12. The method of claim 1, further including:
deciding whether to continue refining the measure of interest;
selecting another subset of pixels, from the candidate start region, having enough information for signal detection; and
using the another subset of pixels, computing another measure of interest.

13. The method of claim 1, wherein selecting a subset of pixels includes:
selecting a plurality of horizontal stripes of the candidate start region as a subset of pixels.

14. The method of claim 1, wherein the measure of interest of the subset of pixels is used to distinguish blank regions from non-blank regions.

15. The method of claim 1, wherein computing a measure of interest of the subset of pixels includes:
determining a number of pixels in the candidate start region that have an edge magnitude exceeding an edge magnitude threshold.

16. The method of claim 1, wherein deciding whether the measure of interest is sufficient to warrant further examination includes:
comparing the measure of interest to a threshold.

17. The method of claim 1, wherein growing the candidate start region includes:
choosing a seed region that overlaps at least a portion of the candidate start region; and
growing the seed region to form the candidate symbol region, using at least the signal orientation.

18. The method of claim 1, wherein choosing a candidate start region in the image includes:
selecting a rectangular region of an image as the candidate start region; and
selecting several horizontal stripes of the rectangular region as a subset for analysis.

19. A method for omnidirectional location of bar code symbols and other graphical code symbols in an image of an object, each code symbol having an oriented encoded signal, the method comprising:
choosing a candidate start region in the image;
determining whether the candidate start region includes at least a portion of a candidate oriented encoded signal, including analyzing a histogram of edge angles;
determining an approximate orientation of the candidate oriented encoded signal; and
growing the candidate start region, using the approximate orientation, so as to form a candidate symbol region that encloses an entire candidate code symbol, including at least a portion of the candidate start region.

20. A method for omnidirectional location of bar code symbols and other graphical code symbols in an image of an object, each code symbol having an oriented encoded signal, the method comprising:
choosing a candidate start region in the image;
determining whether the candidate start region includes at least a portion of a candidate oriented encoded signal, including:
applying an oriented edge detector to the candidate start region to provide a plurality of edge angles;
computing an edge angle histogram based on the plurality of edge angles; and
analyzing the edge angle histogram to determining whether the candidate start region is likely to include at least a portion of a candidate oriented encoded signal;
determining an approximate orientation of the candidate oriented encoded signal; and
growing the candidate start region, using the approximate orientation, so as to form a candidate symbol region that encloses an entire candidate code symbol, including at least a portion of the candidate start region.

21. The method of claim 20, wherein analyzing the edge angle histogram includes:
detecting peaks in the edge angle histogram;
selecting a set of peaks in the edge angle histogram consistent with presence of an oriented encoded signal;
computing total area under the set of peaks; and
comparing the total area to a total area threshold.

22. A method for omnidirectional location of bar code symbols and other graphical code symbols in an image of an object, each code symbol having an oriented encoded signal, the method comprising:
choosing a candidate start region in the image, including selecting a rectangular region of the image;
determining whether the candidate start region includes at least a portion of a candidate oriented encoded signal, including:
selecting several horizontal stripes of the rectangular region as a first subset;
computing approximate edge magnitude pixels at a plurality of positions within the several horizontal stripes;
computing a first count of edge magnitude pixels by counting how many edge magnitude pixels have an edge magnitude that exceeds a first magnitude threshold;
determining whether the first count exceeds a first edge pixel count threshold;
selecting at least some of the rectangular region as a second subset;
computing edge magnitude pixels at a plurality of positions within the several horizontal stripes;
computing a second count of edge magnitude pixels by counting how many edge magnitude pixels have an edge magnitude that exceeds a second magnitude threshold; and determining whether the second count exceeds a second edge pixel count threshold so as to determine whether the candidate start region is interesting;

determining an approximate orientation of the candidate oriented encoded signal; and growing the candidate start region, using the approximate orientation, so as to form a candidate symbol region that encloses an entire candidate code symbol, including at least a portion of the candidate start region.

23. The method of claim 22, wherein computing edge magnitude and computing approximate edge magnitude is performed using a Roberts Cross edge detector.

* * * * *